United States Patent [19]
Hess

[11] Patent Number: 5,560,321
[45] Date of Patent: Oct. 1, 1996

[54] ANIMAL HARNESS FOR DISPENSING LITTER BAGS

[76] Inventor: Howard A. Hess, 190 Windward St., Shell Beach, Calif. 93449

[21] Appl. No.: 499,223

[22] Filed: Jul. 7, 1995

[51] Int. Cl.$^6$ ................................................ A01K 29/00
[52] U.S. Cl. ................................................ 119/858
[58] Field of Search .................. 119/95, 792, 858, 119/907; 221/33, 45, 48; 224/222, 224, 242, 249

[56] References Cited

U.S. PATENT DOCUMENTS

| | | | |
|---|---|---|---|
| D. 313,677 | 1/1991 | Hammon et al. | D30/152 |
| 1,184,311 | 5/1916 | Boch | 224/222 |
| 3,485,413 | 12/1969 | Vestal | 221/33 |
| 3,986,744 | 10/1976 | Krogstad et al. | 294/1.3 |
| 4,156,400 | 5/1979 | Migdal | 119/161 |
| 4,171,760 | 10/1979 | Gay | 224/241 |
| 4,350,274 | 9/1982 | Morgan | 224/205 |
| 4,658,962 | 4/1987 | Burns et al. | 221/45 X |
| 4,850,486 | 7/1989 | Neibaur | 221/45 X |
| 5,178,426 | 1/1993 | David et al. | 294/1.3 |
| 5,184,762 | 2/1993 | Nevitt | 119/858 |
| 5,233,942 | 8/1993 | Cooper et al. | 119/792 |
| 5,363,809 | 11/1994 | Roe | 119/858 X |
| 5,441,017 | 8/1995 | Lindsay | 119/858 X |

FOREIGN PATENT DOCUMENTS

| | | | |
|---|---|---|---|
| 191321 | 1/1923 | United Kingdom | 224/222 |

*Primary Examiner*—Robert P. Swiatek
*Assistant Examiner*—Elizabeth Shaw
*Attorney, Agent, or Firm*—Coudert Brothers

[57] ABSTRACT

A pet animal pocket-in-harness is provided with a dispensing means, e.g. a convenient slot within the pocket containing disposable animal liter bags, and straps attached to the pocket for adjustably positioning the pocket on the animal. The harness is suitable for being continuously worn by the pet without interfering with normal activities and is always available for use each time the pet is taken for a walk.

13 Claims, 2 Drawing Sheets

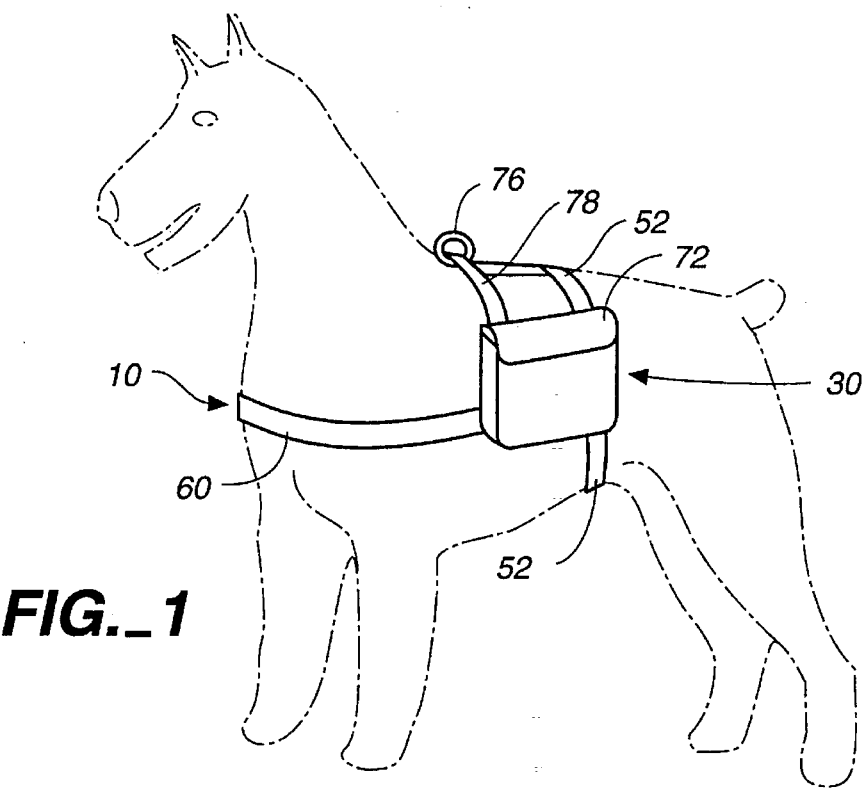
FIG._1
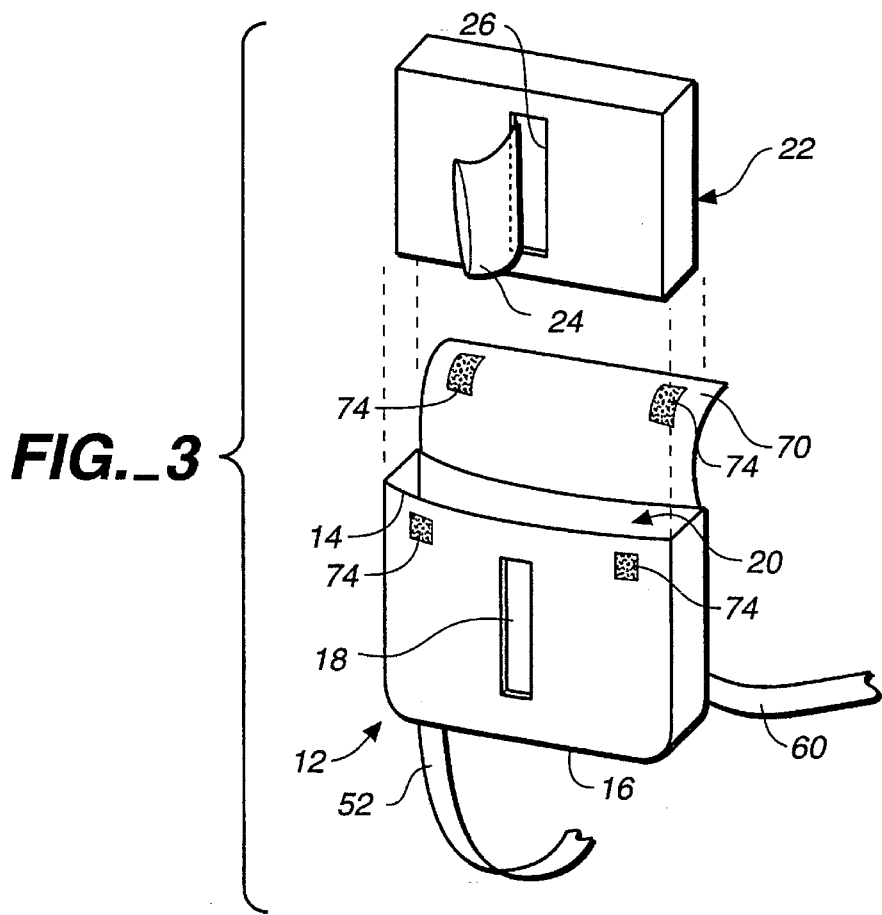
FIG._3

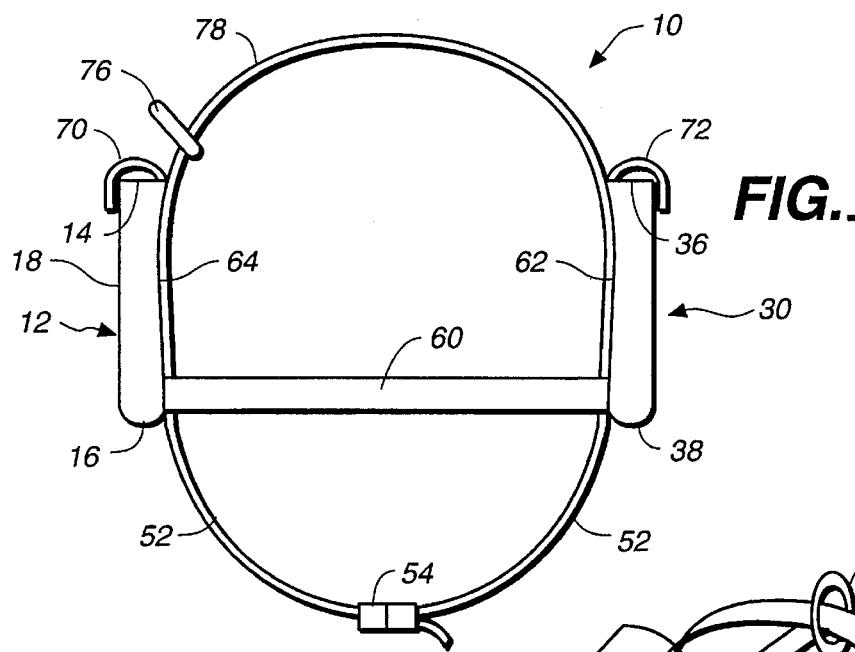
FIG._2
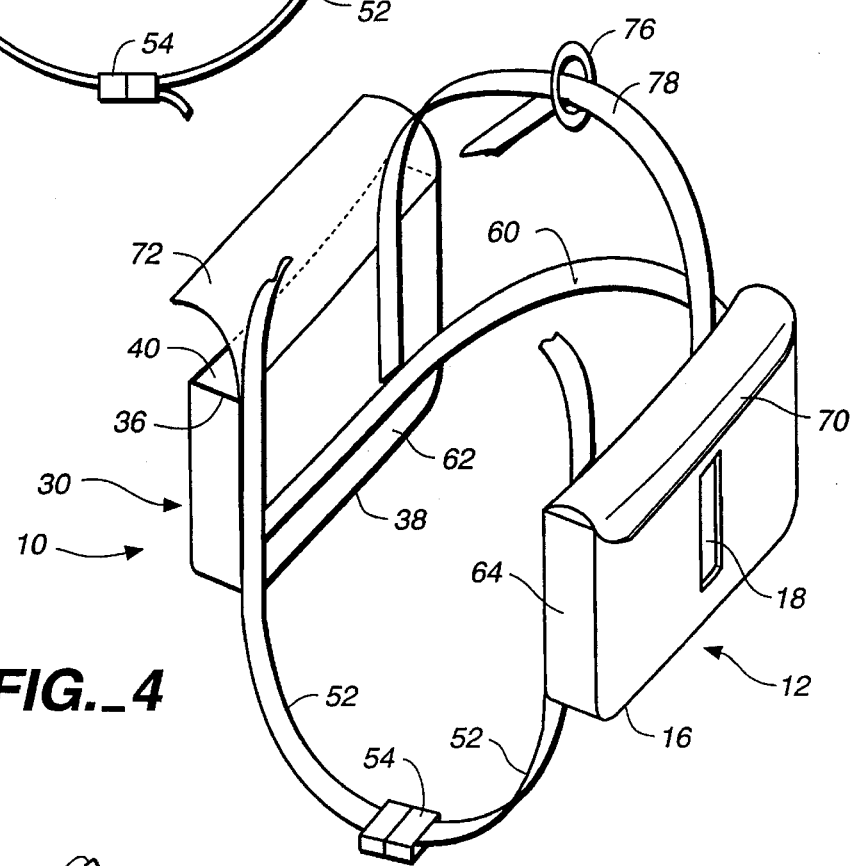
FIG._4
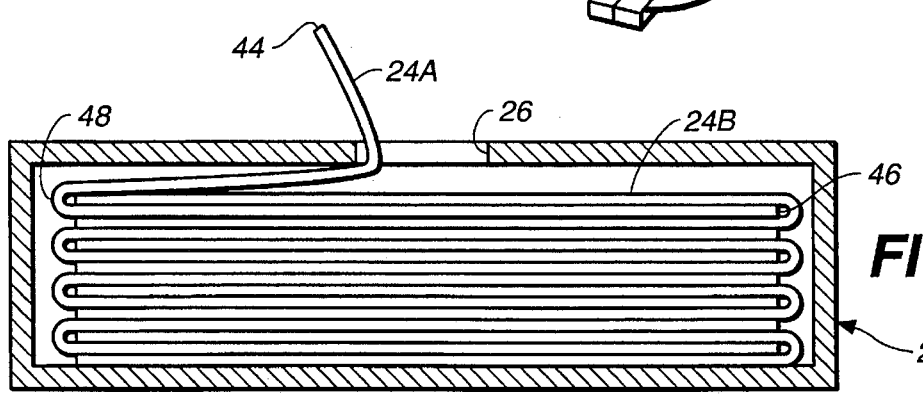
FIG._5

ANIMAL HARNESS FOR DISPENSING LITTER BAGS

BACKGROUND OF THE INVENTION

1. Field of the Invention

This invention relates generally to an animal harness and more particularly to a dog harness with at least one pocket for dispensing a litter bag used for containing and disposing of feces.

2. Description of the Prior Art

Municipal ordinances have been passed throughout the country to assess criminal fines against animal owners who do not clean up after their pets during walks on public property as well as the private property of others. By far dogs are the most common pets that require frequent walks, however other animals including pet pigs could be provided with the harness of the present invention. Often the pet owner or handler places a lease on the harness and is out on the walk before the owner remembers no convenient means are available to pick up and remove the animal excrements. There is a need for a harness that is always equipped with such a means for cleaning up after one's pet without having to remember to bring along the necessary disposal bags, pads, refuse collecting devices and other similar prior art means that are available. Assuming the person has cleaned up after the animal, the feces must be carried through the remainder of the outing or until means for disposal are available.

Examples of the foregoing prior art means disposal of animal feces are disclosed and claimed in U.S. Pat. Nos. 3,986,744; 4,156,400; and 5,178,426. U.S. Pat. No. Des. 313,677 discloses an ornamental design for a combined dog harness and packs. A pet owner could equip his or her pet with such a pack each time the pet is taken for a walk. However, it would still require including the necessary disposal bags and the like in the pack on the harness each and every time the pet is taken on a walk. The problem with such a pack is that it is too bulky to be practical for remaining on the pet twenty four hours a day. There is a need for a pocket-in-harness combination which contains means for dispensing of the disposable litter bags. There is also a need for a harness that can be continuously and comfortably worn on the pet so that the litter bags are constantly available for use when the pet is taken for a walk. There is still further a need for a pocket-in-harness which enable one to temporarily store a used litter bag until a proper disposal can be made.

SUMMARY OF THE INVENTION

The present invention provides a combination of an animal harness and at least one pocket and dispensing means within the pocket for dispensing an animal litter bag from the pocket. The combination of a pocket and dispensing means is designed to be of such a thickness so that while it is worn by the animal, the combination does not interfere in any way with the normal activities of the pet. For example, the pet can easily sleep on the same side as the pocket without any appreciable effect on the comfort of the animal. The harness of the present invention is especially designed so that it does not have to be removed and placed back on each time the pet is taken for a walk.

The dispensing means comprises a slot, slit or other small opening in the pocket which contains one or more disposable bags which can easily be removed through the dispensing means, hereinafter referred to as a slot, by pulling on an open top of the bag. Preferably, the dispersing means includes a plurality of litter bags piled one on top of another within the pocket in a nested manner. This allows one to pull at least the edge at the opening of the top litter bag that is in a ready-to-use position adjacent to the slot of the pocket and to dispense the top bag from the pocket through the slot while the edge of the next bag is being pulled by the top bag for placement in the ready-to use position. Still more preferably, the nested litter bags are stored within a suitable container in a similar manner that facial tissues are packaged in a box, diaper disposal bags are packaged in a plastic bag and paper towels are packaged in a dispenser for easy use. A weeks supply of disposable bags can be stored in a container suitable for use within the pocket of the present invention such that the total thickness of the pocket and container is less than one inch. The exact width and length of the pocket can vary depending on the type of dog. Generally the pocket ranges from about 3 to about 6 inches in width to about 5 to about 8 inches in length. Preferably, the container has no sharp edges and can be a plastic bag with a slit corresponding in size to that of the slot in the pocket. The disposable bags preferably are made of paper or other biodegradable material such as biodegradable plastics.

The pocket can be worn either on the side or on the back of the animal. In the preferred embodiment, the pocket with the dispensing means is on one side and the pocket to store used disposal bags is on the other side.

BRIEF DESCRIPTION OF THE DRAWINGS

FIG. 1 is prospective view of the front and left side of one embodiment of the animal harness with pockets of the present invention;

FIG. 2 is a front elevational view of one embodiment of the harness with pockets of the present invention;

FIG. 3 is a right side elevational view a pocket with dispensing means for dispensing disposable animal litter bags from the harness of the present invention;

FIG. 4 is a prospective view of the rear and right side of one embodiment of the harness with pocket of the present invention; and FIG. 5 is a prospective view, partially in cross-section, illustrating dispensing means for dispensing disposable animal litter bags for use in combination with the harness with pockets of the present invention.

DESCRIPTION OF A PREFERRED EMBODIMENT

Referring now to FIGS. 1–5, animal harness 10 is shown on a dog in phantom. Harness 10 has first pocket 12 having top 14, bottom 16, slot 18 between top 14 and bottom 16 and opening 20 in top 14 for receiving container 22 of unused animal litter bags 24. Container 22 has slit 26 which corresponds to slot 18. Second pocket 30 has top 36, bottom 38 and opening 40 in top 36 for receiving a used animal litter bag. Second pocket 30 can also be used to store a scoop (not shown) or other tools for handling the animal excrements. Container 22 with unused animal litter bags 24 nested in a manner to provide the means within first pocket 12 for dispensing the unused animal litter bag from slot 18. For example, top bag 24A having open top 44 and closed bottom 46 is folded in half with open top 44 outside slot 18 and closed bottom 46 adjacent crease 48 of bag 24B, that is the next bag to be dispensed, as shown in FIG. 5.

First strap 52, attached between bottom 16 and bottom 38 of first pocket 12 and second pocket 30, respectively, is adjustably positioned around the stomach of the animal and tightened by buckle 54. Second strap 60, attached between side 62 and side 64 of first pocket 12 and second pocket 30, respectively, is adjustably positioned around the chest of the animal.

Opening 20 of first pocket 12 and opening 40 of second pocket 30 are provided with closure means in the form of flap 70 and flap 72, respectively. Each of the flaps are provided with conventional VELCRO fasteners 74. Other types of fasteners can be used in place of VELCRO fasteners such as a zippers and hooks and eyes.

Leash ring 76 is shown attached to the edge web 78 joining top 14 of pocket 12 and top 36 of pocket 30 and adjacent to top 14. Ring 76 could just as easily be attached to strap 60 if this method is preferred.

Without departing from the spirit and scope of this invention, one of ordinary skill in the art can make many other changes and modifications to the pocket-in-harness of the present invention to adapt it to specific usages and conditions. As such, these changes and modifications are properly, equitably, and intended to be, within the full range of equivalents of the following claims.

What is claimed is:

1. An animal harness comprising at least one pocket having dispensing means within said at least one pocket for dispensing an animal litter bag from said at least one pocket having a top for being adjustably positioned adjacent to the back of the animal and having an opening for receiving said animal litter bag and a closed bottom, and a closure means mounted on said at least one pocket having a flap over the opening in said top for closing substantially the entire opening, and strap means attached to said at least one pocket for adjustably positioning said at least one pocket on the animal.

2. The harness of claim 1 wherein said dispensing means comprises a slot within the pocket between said top and said bottom and at least one animal litter bag within said pocket for dispensing through said slot.

3. The harness of claim 1 wherein a leash ring is operably mounted for attaching an animal leash.

4. The harness of claim 1 wherein said closure means includes fastener means for fastening said flap to said pocket.

5. The harness of claim 4 wherein said fastener means comprises a fastening tape consisting of opposing pieces of fabric between the flap and the pocket, with one piece having tiny hooks and the other piece having a dense pile, which pieces interlock when pressed together.

6. The harness of claim 1 wherein said strap means comprises a first strap attached to the closed bottom of said pocket and adjustably positioned around the stomach of the animal and a second strap attached between the top and bottom of said pocket and adjustably positioned around the chest of the animal.

7. The harness of claim 6 wherein a second pocket is adjustably positioned along the other side of the animal.

8. The harness of claim 7 wherein said second pocket has an opening for receiving at least one used litter bag.

9. The harness of claim 8 wherein said first strap is attached between the closed bottom of said pocket having the slot and the second pocket and said second strap is attached between the pocket having the slot and the second pocket.

10. An animal harness comprising a first pocket having a top, a bottom, a slot between the top and bottom and an opening in the top for receiving at least one unused animal litter bag, a second pocket having a top, a bottom and an opening in the top for receiving at least one used animal litter bag, an unused animal litter bag within said first pocket which is dispensed from the slot in said first pocket, a first strap attached between the bottom of each of said first and second pockets and adjustably positioned around the stomach of the animal, and a second strap attached between the first and second pockets and adjustably positioned around the chest of the animal.

11. The harness of claim 10 wherein a plurality of unused animal litter bags are nested within said pocket so that at least an edge of a first litter bag is within and adjacent to the slot of said first pocket and wherein the dispensing of the first litter bag from the slot of the container by the user causes at least an edge of the next nested litter bag to be in a position adjacent the slot for subsequent dispensing until all of the bags have been dispensed.

12. The harness of claim 10 wherein a container for the unused animal litter bags having a top, a bottom, and an opening in the top coinciding with the slot in said first pocket.

13. A combination of a dispensing means for dispensing unused animal litter bags from a slot within a pocket and a pocket being adjustably positioned on an animal harness, said dispensing means comprising a top, a bottom, and an opening in the top coinciding with the slot in said pocket, a plurality of the nested unused animal litter bags piled from the bottom to the top of said container so that at least an edge of the litter bag at the top is within and adjacent to the slot of the pocket and wherein the dispensing of the top litter bag from the slot of the container by the user causes at least an edge of the next nested litter bag to be in a position adjacent the slot for subsequent dispensing until all of the bags have been dispensed.

* * * * *